United States Patent [19]

Irwin et al.

[11] Patent Number: 4,466,821
[45] Date of Patent: Aug. 21, 1984

[54] BAFFLE MOVING AND ALIGNMENT MEANS FOR THE FOUR GOB GLASS FORMING MACHINE

[75] Inventors: George W. Irwin, Holland, Ohio; Eustace H. Mumford, Ottawa Lake, Mich.

[73] Assignee: Owens-Illinois, Inc., Toledo, Ohio

[21] Appl. No.: 452,229

[22] Filed: Dec. 22, 1982

[51] Int. Cl.³ .............................................. C03B 9/36
[52] U.S. Cl. ....................................... 65/307; 65/261; 65/323; 65/260
[58] Field of Search ................. 65/323, 260, 261, 263, 65/233, 293, 307

[56] References Cited

U.S. PATENT DOCUMENTS

| | | | |
|---|---|---|---|
| Re. 27,834 | 12/1973 | Dahms | 65/323 |
| 3,403,016 | 9/1968 | Smith | 65/261 |
| 3,472,642 | 10/1969 | Irwin | 65/261 |
| 3,549,191 | 12/1970 | Sarkozy | 65/260 |
| 3,561,941 | 2/1971 | Dahms | 65/261 |
| 3,586,494 | 6/1971 | Mumford | 65/323 |
| 4,009,019 | 2/1977 | Foster | 65/261 |
| 4,261,724 | 4/1981 | Sarkozy | 65/323 |

*Primary Examiner*—William F. Smith
*Assistant Examiner*—Michael K. Boyer
*Attorney, Agent, or Firm*—Gerald T. Welch; Myron E. Click

[57] ABSTRACT

A glassware forming machine is shown which has a baffle support arm. The baffle support arm provides for four individual baffle holders which are grouped in adjacent pairs. The pairs of holders are interconnected by an equalizer arm and are biased into position by a leaf spring above and by a coil spring below. The equalizer arms are connected intermediate their lengths to a third larger equalizer bar which is pivoted for a rocking motion. The apparatus further comprises means for lifting and moving the baffle support arm and a latch means for changing the baffle holders.

7 Claims, 4 Drawing Figures

BAFFLE MOVING AND ALIGNMENT MEANS FOR THE FOUR GOB GLASS FORMING MACHINE

BACKGROUND OF THE INVENTION

Prior art baffle configurations for triple gob glassware forming machines have generally utilized either individual springs for each baffle carrier, which springs are designed to urge each associated baffle downwardly in the carrier with a prevent force, or utilize a single spring having the effect of distributing the force more equally among the three baffle holders.

U.S. Pat. No. 3,472,642 to Irwin shows an example of the individual spring baffle configuration, while U.S. Pat. No. Re. 27,834 to Dahms shows a single spring configuration. In addition, U.S. Pat. No. 3,586,494 to Mumford shows a triple gob baffle moving and alignment system in which individual springs are used to urge the baffles into their seating position on the parison molds on the two outside molds, while the center baffle is carried, generally, on an immovable support relative to the arm for carrying the baffles. More recently, a triple gob baffle construction of U.S. Pat. No. 4,261,724 to Sarkozy shows an arrangement where the two outer baffle holders may move up and down relative to the center one, but are provided with an equalizing bar from the outer to the center at each side, thus, permitting the misalignment vertically of the baffle holders and baffles while still, theoretically, providing the same baffle hold down force on all three. The system of Sarkozy is a pivotal lever system without the inclusion of springs.

SUMMARY

This invention relates, generally, to the manufacture of glass containers in a Hartford IS type glassware forming machine and specifically deals with an improved means for mounting the individual baffle in a carriage handling four baffles. The four baffles cooperate with the individual mold of a multi-gob machine at the blank station in such machine section. Although the drawings show a preferred embodiment of the invention as applied to the baffle carrying side of the machine, it should be recognized that the invention need not be limited, and, it also could be adapted for use on the blow mold side of the machine sectioned for carrying the blowheads into and out of position relative to the four blow molds.

In a typical glass forming machine, the gobs are fed through the open upper ends of inverted blank molds at the blank mold station. Suitable neck ring molds are associated with the lower ends of the inverted blank molds with neck pins being adapted to mold the neck of the parison. As described in the well-known Ingle U.S. Pat. No. 1,911,119, a settle blow head is provided on a suitable carrier or arm adapted to be lowered into position at the top of the funnel. After settle blow has been applied to the upper end of the blank or parison mold, the settle-blow head is raised out of position and the funnel is removed. The settle-blow head is again lowered into position on the blank mold, and, at this point in time, serves as the baffle for closing the upper end of the parison mold, and permitting counter blowing of the parison through the neck ring mold into contact with the baffle.

The primary object of the present invention is to provide a baffle and or settle-blow head assembly which does not rely upon either individual springs for each of the baffle holders, but relies on a lever system for effecting equalizing closing forces on all of the baffles. A further object is to provide means for moving the baffles vertically and horizontally substantially equal distances from their respective parison mold cavities so as to utilize the minimum amount of space when the baffle arm is swung out of position over the parison mold, avoiding interfering with the adjacent machine section.

DETAILED DESCRIPTION OF THE DRAWINGS

Particular reference may be had to U.S. Pat. No. 3,586,494 of Mumford, assigned to the assignee of the present case wherein a disclosure is provided of a baffle operating mechanism for a triple cavity I.S. type forming machine. It will be noted from this patent the general configuration of an I.S. type glass forming machine to which the present invention applies, it being seen from this patent, that a vertical reciprocating mechanism will operate to move a baffle arm carrying baffles up and down while at the same time rotating the vertically reciprocated shaft. In addition, a fixed shaft is positioned parallel to the axis of the vertically reciprocated shaft, and that this vertical, fixed, parallel shaft serves as the pivot axis for a parallel linkage mechanism having a link extending generally in parallel to the baffle supporting arm.

Figure 1:
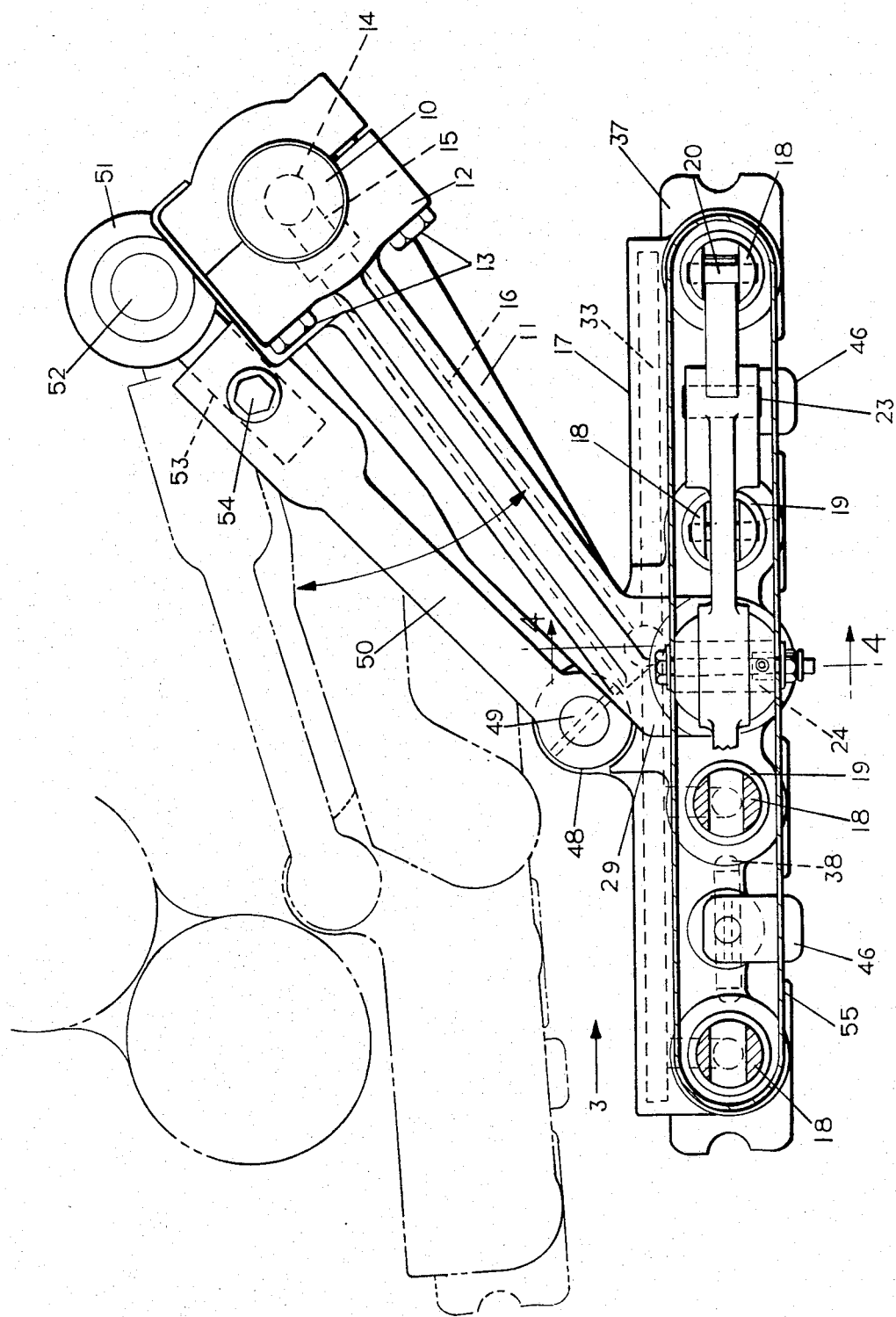
FIG. 1 is a top plan view of a baffle carrying arm in accordance with the present invention with portions shown in horizonal sections to reveal the configuration of certain parts thereof.
Figure 2:
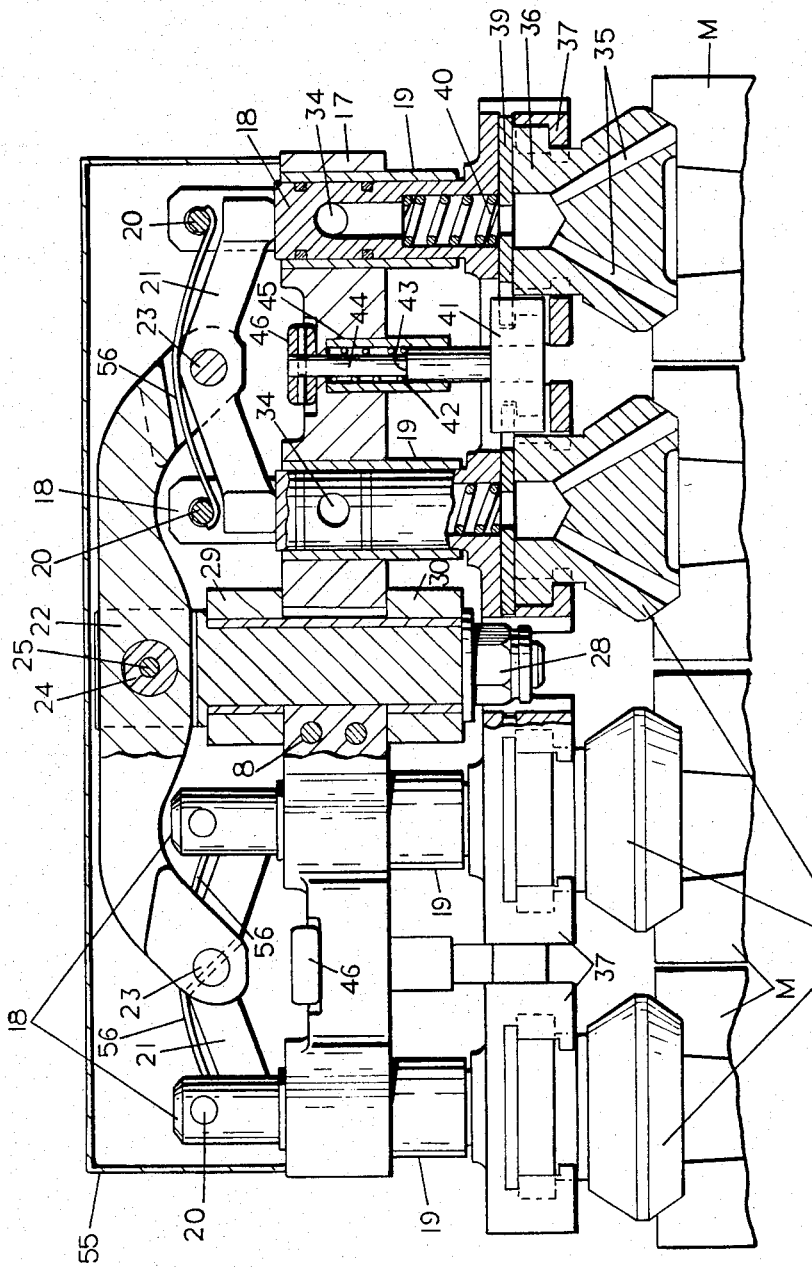
FIG. 2 is a side elevational view with a portion of the right hand side mechanism in vertical section to show the internal configuration of these portions.
Figure 4:
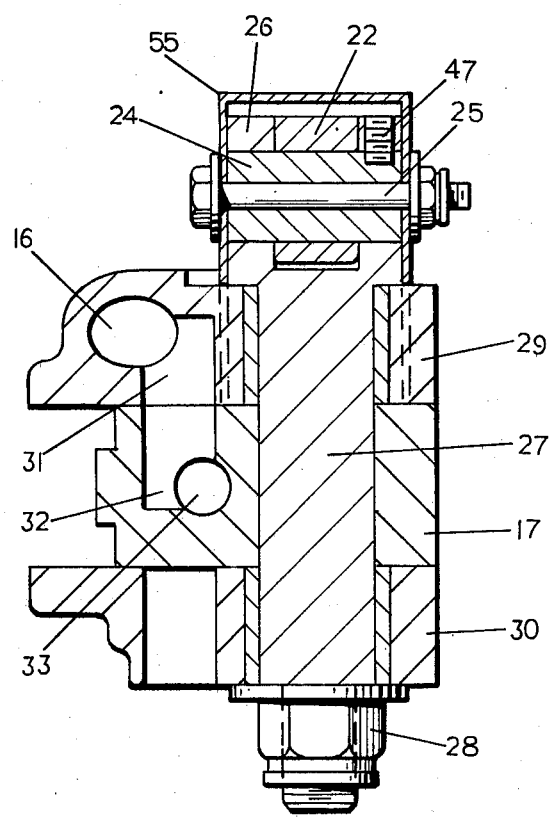
FIG. 4 is a cross-sectional view on an enlarged scale taken at line 4—4 of FIG. 1.

In the above-referred-to patent there is shown in FIG. 2, an arm given the numeral 22 with the vertically reciprocating shaft, numeral 23, and the parallel link arm being given the number 27. The mechanism for raising and lowering the shaft 23 is schematically shown in FIG. 4, where a cylinder 24 having a piston therein connected to the shaft 23, also has the shaft 23 extending downwardly into a cam housing, which carries the cam track 26, and the lower end of the rod carries a cam follower 25. Thus, it can be seen that upon vertical reciprocation of the rod 23 in FIG. 1, the follower will move up in the cam 26 and then following in the track of the cam, so as to twist or turn the rod 23. At this time the baffle mechanism is raised first and then rotated out and away from a position overlying the molds. A similar arrangement and operation is provided in the present invention.

Figure 3:
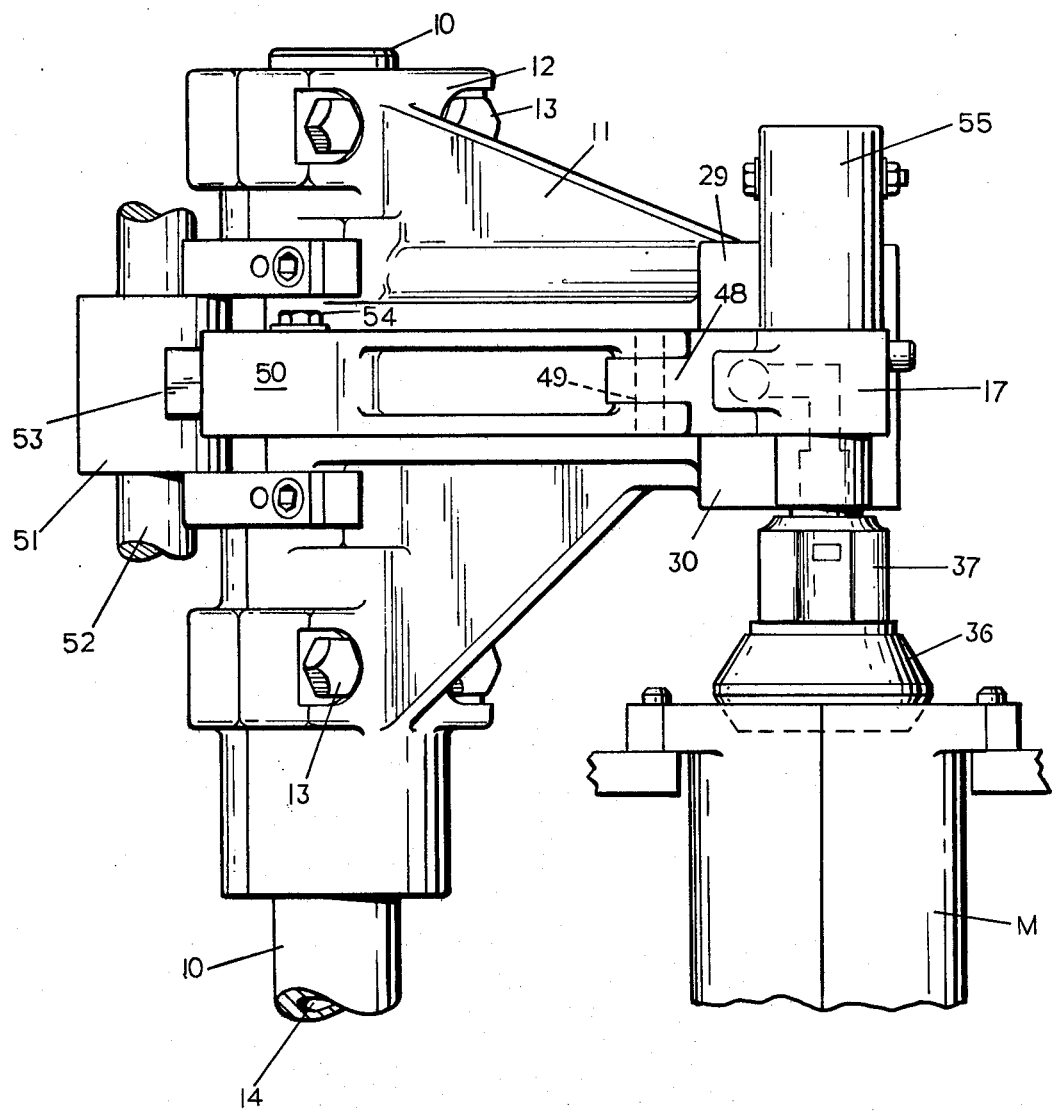
FIG. 3 is an end view taken generally in the direction of the arrow 3 on FIG. 1.

With particular reference to FIGS. 1 and 3, a vertically positioned shaft 10 has a horizontally extending arm 11 formed intergral with a vertically extending split sleeve 12. The split sleeve 12 surrounds the upper end of the shaft 10 and is clamped thereto by bolts 13. The shaft 10 is provided with a hollow passage 14 extending vertically upward therein. A branch passage 15 extending from the passage 14 opens into a passage 16 which extends the length of the arm 11. In this manner, air for the purpose later to be described, may pass upwardly through the shaft 10 and out through the arm 11 to a baffle support arm 17. The baffle support arm 17 is provided with four vertical openings which extend therethrough within which baffle holders 18 are positioned. Each holder 18 is positioned within a sleeve bearing 19 in the openings in the arm. The upper end of the baffle holders 18 are bifur-cated and provided with horizontal pins 20 spanning the gap therebetween. The two baffle holders 18, at each side of the center of the support arm 17, are engaged at their tops between the bifurication thereof with an equalizer bar 21. The equalizer bars 21; of which there are two, intermediate their ends, are connected to the opposing ends of a large equalizing bar 22 by pivot pins 23. The pivot pins 23 actually extend through the intermediate point of the equalizer bars 21 and through bifuricated ends of the larger equalizer bar 22 and span the gap therebetween. The larger equalizer bar 22 is pivoted at its center to a horizontal pivot 24. The pivot 24 carries a central bolt 25 extending axially thereof. The bifuricated upper end 26 of the vertical round shoulder bolt 27, (See FIG. 4) extends downwardly through a central opening formed in the baffle support arm 17. The lower end of the bolt 27 is provided with a lock nut 28. A pair of clamp bolts 8 serve to clamp the arm 17 to the bolt 27.

As can best be seen in FIG. 4, the shoulder bolt 27 extends through bushings in an upper and lower portion 29 and 30, respectively, of the forward end of the arm 11 and is rotatable relative thereto. The upper portion 29 carries the passage 16. Furthermore, adjacent the shoulder bolt 27 the passage 16 merges with a downwardly extending passage 31 which is in alignment with a vertical passage 32 in the center of the arm 17. The passage 32 opens into a horizontal manifold 33 which extends substantially the full length of the arm 17 and provides air to each of the baffles through horizontal holes 34 provided near the upper end of the baffle holders and these holes 34 in turn communicate with vertical passages 35 which extend down through the vertical axis of each of the holders 18. The air which comes down through the holders 18 may then pass out through exit passages 35 and is used when the baffles are seated upon guide funnels, as settle-blow air when and the gobs which have fallen into the parison molds are being settle blowed by air pressure applied from the upper end of the parison molds. It should be pointed out that the exit passages 35 actually are formed in baffles 36. As shown in FIGS. 2 and 3, the baffles are in position closing the upper end of the mold and will serve to form the extreme upper end of the inverted parisons in the parison molds. The baffles 36 are mounted within lower, baffle lock rings 37 with a bayonet type configuration wherein the baffle 36 is turned 90° with respect to the position shown in FIG. 2 when being inserted or removed from the lock ring 37. Each baffle is provided along one edge thereof with a keyway 38 which is in vertical alignment with a keyway provided in each of the lock rings 37 and in a pressure plate 39 that is positioned between the upper end of the baffle and the lower inner lock ring 37 of the baffle holder 18. This pressure plate 39 is spring biased downwardly, as best illustrated in FIG. 2, by a compression spring 40. A baffle lock bar 41 in the form of an elongated bar that will extend down through the adjacent keyways formed in the baffles 36, the pressure plates 39, and the lower baffle lock rings 37, at points intermediate the two adjacent baffles at either end of the baffle arm 17. The lock bar 41 is spring biased downwardly by a spring 42 riding against a shoulder 43 of a vertical pin 44 that is guided in a bushing 45 and a vertical opening in the baffle support arm 17 intermediate the two adjacent baffle holders 18. The upper end of the pin 44 is provided with a finger gripping head 46 (See FIG. 1). Thus, it can be seen that by grasping the head 46 the lock bar 41 may be elevated a sufficient amount such that the baffle 36 may be rotated through 90° and be removed from the baffle locking ring 37 when desired. Each baffle is held firmly within its lock ring by the downward force exerted by the spring 40 against the pressure plate 39 which bears against the upper surface of the baffle 36.

Turning again to FIG. 4, it is seen that the large equalizer bar 22 has its pivot axis supported by the pivot 24. The pivot 24 in turn is locked by a set screw 47 in the upper end 26 of the bolt 27.

The arm 17, as best seen in FIGS. 1 and 3, is provided with a rearwardly extending boss 48. The boss 48 serves as the pivot support for a vertical pin 49. The pin 49 extends beyond the ends of the boss 48. The extending ends of the pin 49 serve as a pivot for a bifurcated, elongated arm 50. The arm 50 is formed in two pieces with the bifurcated piece being the end that is connected to the pin 49 with the opposite end of the arm 50 being connected to a vertical sleeve 51. The sleeve 51 is rotatably mounted with respect to a vertical shaft 52. The sleeve 51 has a horizontally extending portion 53 that extends into an opening formed in the one end of the arm 50 and is adjustably held therein by a shoulder bolt 54.

As viewed in FIGS. 1–3, of the baffle support arm 17, in full line, is shown in position over and engaging with a series of molds, the molds not being shown in FIG. 1. When the baffle is removed from the parison molds and is positioned so that the invert arm of the IS machine may move upwardly through the area presently occupied in full line by the baffle arm 17, the arm will have been rotated and lifted by the shaft 10, as previously explained, and will be moved to the position specifically shown in dotted line in FIG. 1. It can readily be seen that the movement of the baffle support arm 17 is almost parallel and the purpose of the arm being shifted out of position in the manner illustrated herein is to avoid interference with the funnel mechanism shown in dash lines, of the adjacent section of an IS machine. As stated, the dash line or phantom line circles shows the closeness and position of the funnel mechanism from the adjacent section. The baffle support arm 17 is provided with a cover 55, secured by bolt 25 and the flat washers and lock nut shown. The cover essentially serves to prevent any debris or other nondesirable material from falling into or becoming lodged within the equalizing mechanism of the invention.

As can be seen from the foregoing description of the mechanism, the parallel linkage arrangement of 50 and 11 provide a system whereby rotation of the shaft 10 about its vertical axis will shift the arm 17 away from its position as shown in full line to the position shown in dotted line and in effect the distance between the center of the shaft 10 and the center of the shaft 52 becomes the short arm of a parallel linkage mechanism and it is about the shaft 10 that the arm is rotated.

The particular arrangement of the equalizing arms as shown, specifically, in FIGS. 1 and 2, is very important to the operation of the mechanism for handling four baffles at one time. The large equalizing arm 22 and the two smaller equalizing arms 21, which are pivoted to the extending ends of the large equalizing arm, in effect provide an arrangement for insuring that the holddown force of each of the baffles is essentially the same. This is important because any movement of the baffle relative to the parison mold in which it is seated can result in producing a parison which will have a potentially defect producing configuration. If the baffle moves relative to the mold glass may thread out into a thin line and become extremely chilled and when the parison is transferred to a blow mold this thin web of glass which might be at the extreme end of the parison, will be so chilled that it will not be reheated sufficiently to disappear in the blown bottle, thus, a baffle scar may appear in the bottom of the blown container. Baffle scars have been known to serve as origins for breakage through stress or impact and produce bottles of insufficient impact strength.

Furthermore, the holders 18 are held or biased downwardly by the equalizing arms and a leaf spring 56, which spans between the pins 20, of adjacent pairs of holders 18 and extends over the pivot pin 23, biases the holders 18 upwardly into contact with the ends of the equalizer bars 21. In this manner, the looseness, which would be present between the equalizer bar and the baffle holder, is avoided and the baffle holders are held to avoid this looseness, which has a detrimental effect on the smooth operation of the mechanism over an extended period of time. The leaf springs 56 thus are a significant development in the functional operation of the present invention. Furthermore, the head of the lock bar 41 with its finger operating head 46 provides a system whereby the machine operator may change baffles easily, yet after baffles have been changed they will be securely held in their respective holders.

Other and further modifications may be resorted to within the spirit and scope of the appended claims.

We claim:

1. A glassware forming machine having at least one section including four side-by-side upwardly open parison molds which are closed by baffles, a baffle supporting arm, said arm being elongated and provided with four individual baffle holders as adjacent pairs, said holders extending through vertical bushings in the arm, and being vertically movable therein; first and second pivoted equalizer bars each of which has its ends engaging said adjacent pairs of said holders, a horizontal pin extending through each holder and overlying the end of the first or second equalizer bar that is in engagement with the holder, a third larger equalizer bar pivotally mounted for rocking movement relative to said baffle support arm, and means pivotally supporting each of said first and second equalizing bars, intermediate its length, at each end of the said larger equalizer bar thereby connecting said first and second equalizer bars to said larger equalizer bar.

2. The apparatus of claim 1 further including spring means extending beneath and between the horizontal pins in each adjacent pair of holders for urging the holders in the upward direction to maintain the holders in engagement with the end of the equalizer bars.

3. The apparatus of claim 1 further including bayonet type connection means between the holders and their respective baffles.

4. The apparatus of claim 3 further including a disk between each baffle and its holder and spring means in each holder for urging said disk into engagement with the baffle.

5. The apparatus of claim 1 further including a baffle lock ring formed on the lower end of each holder, complimentary, vertical slots formed in the lock ring and baffle when the baffle is seated properly in the holder and spring biased latch means carried by the baffle support arm and engageable in the complementary slots of adjacent holders and baffles to retain the baffles in their holders against accidental separation.

6. The apparatus of claim 5 wherein said latch means is formed with a head that extends forward of the side of the baffle support arm.

7. The apparatus as set forth in claim 1 further including a cover extending over the baffle supporting arm and enclosing the baffle mechanisms therein.

* * * * *